Nov. 20, 1945.  C. A. PALMGREN  2,389,536
CHUCK
Filed Oct. 23, 1943

Inventor
Charles A. Palmgren
By George D. Haight
Atty.

Patented Nov. 20, 1945

2,389,536

UNITED STATES PATENT OFFICE 2,389,536

CHUCK

Charles A. Palmgren, Chicago, Ill.

Application October 23, 1943, Serial No. 507,350

6 Claims. (Cl. 279—60)

My invention relates to improvements in drill chucks.

One of the objects of my invention is to provide a chuck or drill holder which is relatively inexpensive to manufacture and yet is highly accurate, and which is simple and durable in construction and yet is foolproof.

A further object is to provide a chuck in which the jaws are positively actuated by opposed wedges or cams without the aid of springs.

Other objects of my invention will appear from the following description and claims in connection with the accompanying drawing which illustrates one embodiment of the invention.

Referring to the drawing.

Figure 1:
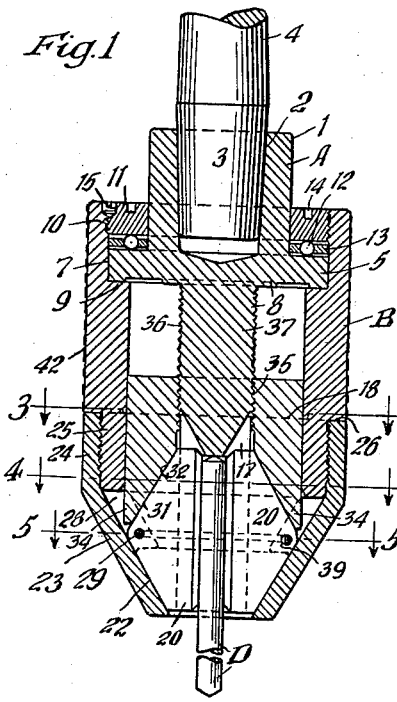
Fig. 1 is a vertical section of a chuck embodying the invention, the section being taken in planes intersecting at an angle of 120° and in which the chuck is illustrated holding a drill of smaller size.
Figure 6:
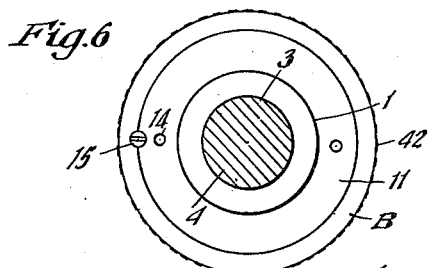
Fig. 6 is the top or upper end view of the structure shown in Figs. 1 and 2.
Figure 7:
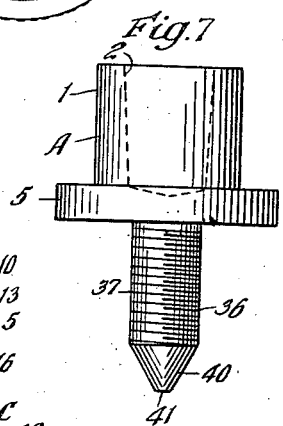
Fig. 7 is a detail view of the central threaded shank, the upper end of which provides the connection with the drill press or lathe.

The chuck shown in the drawing has a body member A which carries the other parts of the chuck and which itself has an enlarged upper end 1 with a tapered socket 2 to fit the tapered end 3 of the drill press or lathe spindle 4. The tapered socket is the usual means for mounting a chuck on the lathe or drill press spindle.

The body member 8 has a lateral flange 5 which supports the hollow barrel or shell B, and upon which said barrel is mounted to rotate relatively to the body member to open and close the jaws. As shown in the drawing, the upper end of the barrel B is enlarged in internal diameter to form a bore or socket 7 of larger diameter. This diameter is substantially the diameter of the flange 5 of the body member and provides a shoulder 9 which bears against the under side of the flange 5. Above the flange 5 the shell has an internal threaded portion 10 to receive a correspondingly threaded ring nut 11. The ring nut is spaced above the flange 5 sufficiently to provide room for a set of ball bearings 12 which are circumferentially spaced by the spacer ring 13. The ring and the flange thus form a race for the ball bearings which take the downward thrust imposed on the parts when the barrel is rotated to tighten the jaws on the drill. The ring has key slots 14 for a suitable wrench by which it may be turned in assembling or disassembling the parts. The ring is locked against rotation by means of the set screw 15.

The barrel B is cylindrical and has cylindrical interior bores of two diameters, the upper bore 16 being the larger, and the lower bore 17 being the smaller, so that an internal shoulder is formed in the transverse plane 18 which determines the line of division between the two bores. The portion of the barrel below the plane 18 has three longitudinal guide slots 19 for the jaws 20. These slots are radially disposed and are spaced apart circumferentially 120° so that the jaws will grip the drill at three equally spaced points. The guide slots open at their upper ends through the transverse internal shoulder and at their inner vertical margins they open into the bore 17. The guide slots 19, for a portion of their length below the shoulder, are of a radial depth equal to the diameter of the larger bore 16. The lower portion 21 of the barrel is exteriorly tapered and is seated against the interiorly tapered wall 22 of a cone-shaped or tapered cap 23. The cap has a tubular upper end portion 24 which is threaded interiorly to screw onto a correspondingly threaded portion 25 of the barrel, this portion of the barrel being reduced in diameter to provide a shoulder 26 against which the end of the cap is seated. The parts are so proportioned that when the cap is screwed up tightly against the shoulder 26, the tapered wall 22 will be drawn tightly against the tapered portion 21 of the barrel. An annular groove 27, with its wall tapered corresponding to the tapered portion 21, is formed in the barrel member above the tapered portion 21 to provide an annular chamber 28 within the cap for the reception of a jaw-retaining spring 29, hereinafter described. The radial guide slots 19 extend downwardly through the tapered portion 21 of the barrel.

The jaws 20 are triangularly-shaped members having parallel flat faces and of sufficient thickness to fit accurately in the guide slots 19, so that they can move or slide both longitudinally and laterally or radially in said slots. The longitudinal or vertical gripping edges are parallel with each other and with the shank of the drill D, and these edges are beveled both ways from their longitudinal center to provide knife edge gripping contact with the drill shank. The outer edges of the jaws are inclined both ways from about a middle point so that they converge upwardly and downwardly toward the axis of the chuck and thus form oppositely directed wedging or cam surfaces. The lower or downwardly converging cam surfaces 30 bear upon the interior downwardly converging wall 22 of the cap. The upwardly converging cam edges 31 contact with the correspondingly inclined cam faces 32 of the jaw-actuating member C.

The jaw-actuating member C is a cylindrical-shaped member 33 of such diameter as to accurately fit the upper bore 16 of the barrel for axial movement relatively thereto. This member has three radially disposed flat-walled webs or fins 34 which fit in and are guided by the guide slots 19; and their inner edges are inclined upwardly to form the inclined cam surfaces 32 which bear upon the jaws. The jaw-actuating member C has an interior bore 35 which is threaded for threaded engagement with the threads 36 of the central stud or stem 37 of body member A, so that relative rotation of the jaw-actuating member with respect to said stem 37 causes it to be moved axially of the stem. Thus the interior cam surface 22 of the cap and the cam faces 32 of the jaw-actuating member form opposed cam members which act upon the correspondingly inclined cam faces 30 and 31 of the jaw members. Thus when the jaw-actuating member C is moved axially toward the cam faces 30 by the rotation of the barrel, the jaws are forced laterally or radially to grip the shank of the drill. These parts are proportioned and arranged so as to maintain the gripping edges of the jaws in parallel relation to each other at all times, regardless of the size of the drill being used within the capacity of the chuck.

Figure 2:
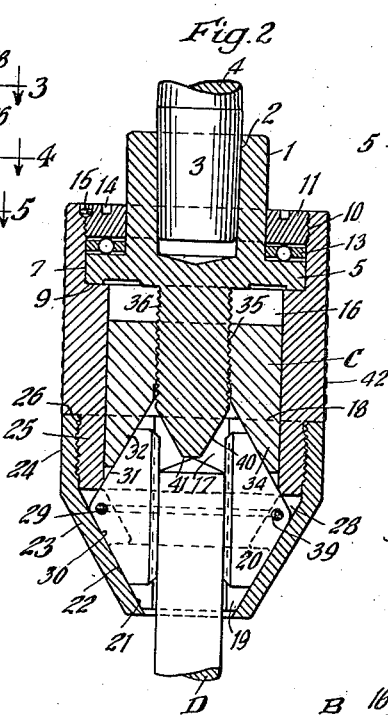
Fig. 2 is a sectional view similar to Fig. 1, illustrating the jaws opened to accommodate a larger size drill.
Figure 8:
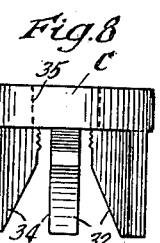
Fig. 8 is a detail view of the lengthwise movable wedge member which operates the jaws.
Figure 3:
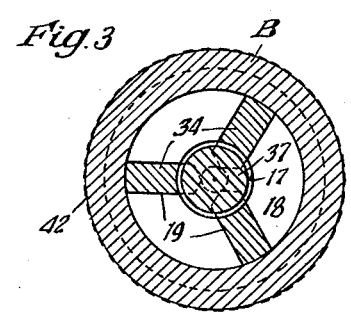
Fig. 3 is a transverse section on the line 3—3 of Fig. 1.
Figure 4:
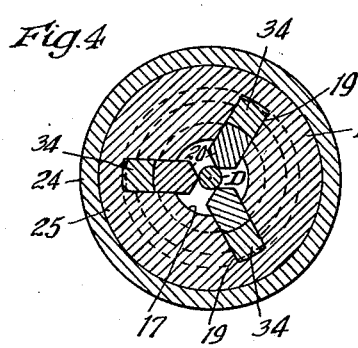
Fig. 4 is a transverse section on the line 4—4 of Fig. 1.
Figure 5:
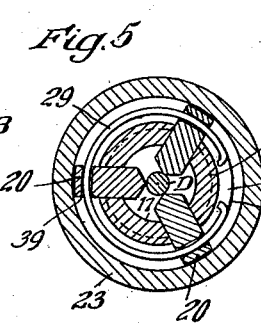
Fig. 5 is a transverse section on the line 5—5 of Fig. 1.
Figure 9:
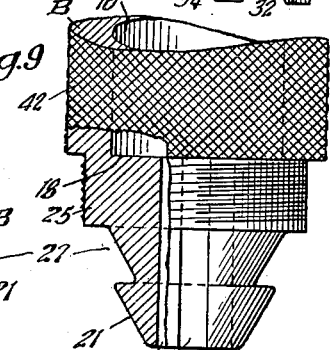
Fig. 9 is a view partly in section of the rotary barrel which actuates the wedge member shown in Fig. 8.

In order to open or retract the jaws as the jaw-actuating member C is moved upwardly on the stem 37, the circular spring member 29, hereinbefore referred to, is provided. This spring, as shown more clearly in Figs. 1, 2 and 5, is in the form of a ring which is passed through holes 39 in the jaws and is normally contracted against its inherent resiliency while it is in place. As the pressure on the jaws is relieved by turning the barrel and thereby moving the member C upwardly, the spring expands to move the jaws radially outwardly. The spring also serves to keep the jaws from falling out of the chuck when there is no drill shank in the chuck.

The inner or lower end 40 of the body stem 37 is tapered downwardly to a small flat surface 41 which serves as a limit stop to the insertion of the drill shank. The exterior 42 of the barrel B is preferably knurled or otherwise treated to provide a suitable grip for the operator's hand in rotating the barrel.

I claim:

1. In a chuck of the class described, the combination of a body member having a central stem, a rotatable barrel member mounted on said body member and rotatable with respect thereto and having a downwardly converging, interior cam surface, a rotatable jaw-actuating member having threaded connection with said stem and having upwardly converging cam surfaces, jaw members mounted in said barrel member and positioned between said downwardly and upwardly converging cam surfaces and having corresponding downwardly and upwardly converging cam surfaces cooperating therewith and adapted upon the rotation of said barrel member to be moved radially inwardly thereof to grip the shank of the drill inserted in said barrel.

2. In a chuck of the class described, the combination of a body member adapted to be attached to the lathe or drill press for gripping said chuck and having a cylindrical stem member, a barrel member concentrically disposed with respect to said stem member and rotatably mounted on said body member, said barrel member having a downwardly converging interior cam surface having a plurality of radially disposed, axially extending slots, a jaw-actuating member rotatable with respect to said stem member and having threaded connection therewith for moving the jaw-actuating member axially of the stem member, said jaw-actuating member having upwardly converging cam members in said slots and jaw members movable longitudinally and radially therein and positioned between said downwardly and upwardly converging cam surfaces said jaw members having corresponding downwardly and upwardly converging cam surfaces cooperating therewith and adapted to be forced radially inwardly by the jaw-actuating member when moved toward said downwardly converging cam surfaces.

3. In a chuck of the class described, the combination of a body member adapted to be attached to the lathe or drill press for gripping said chuck and having a cylindrical stem member, a barrel member concentrically disposed with respect to said stem member and rotatably mounted on said body member, said barrel member having a downwardly converging interior cam surface having a plurality of radially disposed, axially extending slots, a jaw-actuating member rotatable with respect to said stem member and having threaded connection therewith for moving the jaw-actuating member axially of the stem member, said jaw-actuating member having upwardly converging cam members in said slots and jaw members movable longitudinally and radially therein and positioned between said downwardly and upwardly converging cam surfaces said jaw members having corresponding downwardly and upwardly converging cam surfaces cooperating therewith and adapted to be forced radially inwardly by the jaw-actuating member when moved toward said downwardly converging cam surfaces, a spring common to all said jaws acting to move the jaws radially outwardly when the cam members are moved apart.

4. In a chuck of the class described, the combination of a body member, a tubular barrel member rotatable thereon, having downwardly converging interior cam surfaces and having radially disposed, axially extending guide slots, a stem member fixed on said body member within said barrel member in concentric relation thereto, a jaw-actuating member rotatable with said barrel member with respect to said stem member and having threaded connection therewith for moving the jaw-actuating member axially, said jaw-actuating member having upwardly converging cam members movable in said guide slots, gripping jaws in said guide slots movable radially and longitudinally therein and having axially extending gripping edges in parallel relation, said jaw members being positioned between said downwardly converging cam surfaces and said upwardly converging cam members, and having correspondingly inclined cam edges engaging said cam surfaces and cam members and adapted to be moved radially inwardly when the jaw member is moved toward said cam surfaces.

5. In a chuck of the class described, the combination of a body member, a tubular barrel member rotatable thereon having downwardly converging interior cam surfaces and having radially disposed, axially extending guide slots, a stem member on said body member within said barrel member in concentric relation thereto, a jaw-actuating member rotatable on said stem member and having threaded connection therewith for moving the jaw-actuating member axially, said jaw-actuating member having upwardly converging cam members movable in said guide slots, gripping jaws in said guide slots movable radially and longitudinally therein and having axially extending gripping edges in parallel relation, said jaw members being positioned between said downwardly converging cam surfaces and said upwardly converging cam members and having correspondingly inclined cam edges engaging said cam surfaces and cam members and adapted to be moved radially inwardly when the jaw member is moved toward said cam surfaces, and a spring member contracted against its inherent resiliency and engaging said jaw members to move the jaw members radially outwardly when the jaw-actuating member is moved away from said cam surfaces.

6. In a chuck of the class described, the combination of a body member adapted for attachment to the lathe or drill press spindle having an annular lateral flange, a tubular body member rotatably mounted on said flange and having its lower end portion tapered to provide interior, downwardly converging cam surfaces, and having interior, radially disposed, longitudinally extending guide slots, jaw members movable axially and radially in said guide slots and having oppositely directed, inclined cam surfaces, and a jaw-actuating member movable axially within said barrel member, having upwardly converging cam members in said slots, engaging the corresponding cam surfaces of said jaw members, and means for causing the jaw-actuating member to move axially of the barrel member upon rotation of the barrel member.

CHARLES A. PALMGREN.